US008539123B2

(12) United States Patent
Caballero

(10) Patent No.: US 8,539,123 B2
(45) Date of Patent: Sep. 17, 2013

(54) DEVICE MANAGEMENT USING A DEDICATED MANAGEMENT INTERFACE

(75) Inventor: Aldo Caballero, Durham, NC (US)

(73) Assignee: Honeywell International, Inc., Fort Mill, SC (US)

( * ) Notice: Subject to any disclaimer, the term of this patent is extended or adjusted under 35 U.S.C. 154(b) by 39 days.

(21) Appl. No.: 13/267,338

(22) Filed: Oct. 6, 2011

(65) Prior Publication Data
US 2013/0091311 A1  Apr. 11, 2013

(51) Int. Cl.
G06F 3/00 (2006.01)
G06F 13/00 (2006.01)

(52) U.S. Cl.
USPC ............. 710/63; 710/2; 710/5; 710/8; 710/15

(58) Field of Classification Search
None
See application file for complete search history.

(56) References Cited

U.S. PATENT DOCUMENTS

| | | |
|---|---|---|
| 5,109,486 A | 4/1992 | Seymour |
| 5,261,044 A | 11/1993 | Dev et al. |
| 5,402,316 A | 3/1995 | Volz et al. |
| 5,463,742 A | 10/1995 | Kobayashi |
| 5,504,921 A | 4/1996 | Dev et al. |
| 5,546,145 A | 8/1996 | Bernardi et al. |
| 5,552,959 A | 9/1996 | Penniman et al. |
| 5,579,001 A | 11/1996 | Dempsey et al. |
| 5,579,529 A | 11/1996 | Terrell et al. |
| 5,579,775 A | 12/1996 | Dempsey et al. |
| 5,587,560 A | 12/1996 | Crooks et al. |
| 5,615,625 A | 4/1997 | Cassidy et al. |
| 5,640,953 A | 6/1997 | Bishop et al. |
| 5,655,081 A | 8/1997 | Bonnell et al. |
| 5,687,734 A | 11/1997 | Dempsey et al. |
| 5,724,509 A | 3/1998 | Starkweather et al. |
| 5,752,917 A | 5/1998 | Fuchs |
| 5,774,793 A | 6/1998 | Cooper et al. |
| 5,793,967 A | 8/1998 | Simciak et al. |
| 5,798,951 A | 8/1998 | Cho et al. |
| 5,805,442 A | 9/1998 | Crater et al. |
| 5,815,735 A | 9/1998 | Baker |
| 5,819,110 A | 10/1998 | Motoyama |
| 5,825,617 A | 10/1998 | Kochis et al. |
| 5,832,244 A | 11/1998 | Jolley et al. |

(Continued)

FOREIGN PATENT DOCUMENTS

| | | |
|---|---|---|
| WO | WO0217073 A1 | 2/2002 |
| WO | WO2005033964 A1 | 4/2005 |

OTHER PUBLICATIONS

Apr. 2, 2013 Office Action in U.S. Application No. 13/267,342. En.

(Continued)

Primary Examiner — Scott Sun
(74) Attorney, Agent, or Firm — Heslin Rothenberg Farley & Mesiti P.C.

(57) ABSTRACT

Management of data communication between a peripheral device and host computer system is provided. A peripheral device exposes to a host computer system multiple interfaces for data communication between the peripheral device and the host computer system. The multiple interfaces are exposed over a single physical interface between the peripheral device and the host computer system, for communicating data between the peripheral device and multiple applications executing on the host computer system. The multiple interfaces can include a dedicated management interface facilitating management of the peripheral device by a management application of the multiple applications executing on the host computer system.

19 Claims, 5 Drawing Sheets

(56) References Cited

U.S. PATENT DOCUMENTS

| | | |
|---|---|---|
| 5,835,733 A | 11/1998 | Walsh et al. |
| 5,848,253 A | 12/1998 | Walsh et al. |
| 5,862,349 A | 1/1999 | Cho et al. |
| 5,867,714 A | 2/1999 | Todd et al. |
| 5,875,312 A | 2/1999 | Walsh et al. |
| 5,878,256 A | 3/1999 | Bealkowski et al. |
| 5,889,964 A | 3/1999 | Cho et al. |
| 5,921,459 A | 7/1999 | Heraly et al. |
| 5,931,909 A | 8/1999 | Taylor |
| 5,935,244 A | 8/1999 | Swamy et al. |
| 5,941,965 A | 8/1999 | Moroz et al. |
| 5,961,337 A | 10/1999 | Kordes |
| 5,978,591 A | 11/1999 | Bartholomew et al. |
| 6,032,202 A | 2/2000 | Lea et al. |
| 6,037,788 A | 3/2000 | Krajec et al. |
| 6,049,454 A | 4/2000 | Howell et al. |
| 6,070,012 A | 5/2000 | Eitner et al. |
| 6,085,244 A | 7/2000 | Wookey |
| 6,086,430 A | 7/2000 | Amoni et al. |
| 6,088,752 A | 7/2000 | Ahern |
| 6,091,602 A | 7/2000 | Helot |
| 6,098,097 A | 8/2000 | Dean et al. |
| 6,108,717 A | 8/2000 | Kimura et al. |
| 6,109,039 A | 8/2000 | Hougham et al. |
| 6,142,593 A | 11/2000 | Kim et al. |
| 6,151,643 A | 11/2000 | Cheng et al. |
| 6,158,430 A | 12/2000 | Pfeiffer et al. |
| 6,160,719 A | 12/2000 | May et al. |
| 6,161,133 A | 12/2000 | Kikinis |
| 6,171,559 B1 | 1/2001 | Sanders et al. |
| 6,188,572 B1 | 2/2001 | Liao et al. |
| 6,195,265 B1 | 2/2001 | Choi |
| 6,199,108 B1 | 3/2001 | Casey et al. |
| 6,202,209 B1 | 3/2001 | Bartholomew et al. |
| 6,226,739 B1 | 5/2001 | Eagle |
| 6,240,297 B1 | 5/2001 | Jadoul |
| 6,247,074 B1 | 6/2001 | Shin |
| 6,256,691 B1 | 7/2001 | Moroz et al. |
| 6,267,475 B1 | 7/2001 | Lee et al. |
| 6,279,059 B1 | 8/2001 | Ludtke et al. |
| 6,279,154 B1 | 8/2001 | Davis |
| 6,285,911 B1 | 9/2001 | Watts, Jr. et al. |
| 6,297,963 B1 | 10/2001 | Fogle |
| 6,301,106 B1 | 10/2001 | Helot et al. |
| 6,311,321 B1 | 10/2001 | Agnihotri et al. |
| 6,324,692 B1 | 11/2001 | Fiske |
| 6,330,597 B2 | 12/2001 | Collin et al. |
| 6,341,274 B1 | 1/2002 | Leon |
| 6,341,320 B1 | 1/2002 | Watts, Jr. et al. |
| 6,360,362 B1 | 3/2002 | Fichtner et al. |
| 6,378,128 B1 | 4/2002 | Edelstein et al. |
| 6,407,335 B1 | 6/2002 | Franklin-Lees et al. |
| 6,407,915 B1 | 6/2002 | Derocher et al. |
| 6,425,126 B1 | 7/2002 | Branson et al. |
| 6,442,639 B1 | 8/2002 | McElhattan et al. |
| 6,452,325 B1 | 9/2002 | Dupont |
| 6,457,076 B1 | 9/2002 | Cheng et al. |
| 6,461,181 B1 | 10/2002 | Goh et al. |
| 6,467,088 B1 | 10/2002 | alSafadi et al. |
| 6,477,588 B1 | 11/2002 | Yerazunis et al. |
| 6,484,315 B1 | 11/2002 | Ziese |
| 6,489,932 B1 | 12/2002 | Chitturi et al. |
| 6,505,121 B1 | 1/2003 | Russell |
| 6,506,009 B1 | 1/2003 | Nulman et al. |
| 6,511,031 B2 | 1/2003 | Lin |
| 6,519,143 B1 | 2/2003 | Goko |
| 6,539,358 B1 | 3/2003 | Coon et al. |
| 6,542,943 B2 | 4/2003 | Cheng et al. |
| 6,558,049 B1 | 5/2003 | Shin |
| 6,560,643 B1 | 5/2003 | Shepherd et al. |
| 6,560,660 B1 | 5/2003 | Flanagin |
| 6,584,336 B1 | 6/2003 | Ali et al. |
| 6,584,499 B1 | 6/2003 | Jantz et al. |
| 6,587,874 B1 | 7/2003 | Golla et al. |
| 6,593,528 B2 | 7/2003 | Franklin-Lees et al. |
| 6,594,534 B1 | 7/2003 | Crowell |
| 6,606,678 B1 | 8/2003 | Nakamura |
| 6,614,979 B2 | 9/2003 | Bourdeau |
| 6,615,405 B1 | 9/2003 | Goldman et al. |
| 6,628,517 B1 | 9/2003 | Helot et al. |
| 6,633,482 B2 | 10/2003 | Rode |
| 6,658,659 B2 | 12/2003 | Hiller et al. |
| 6,668,296 B1 | 12/2003 | Dougherty et al. |
| 6,683,786 B2 | 1/2004 | Yin et al. |
| 6,684,241 B1 | 1/2004 | Sandick et al. |
| 6,697,032 B2 | 2/2004 | Chitturi et al. |
| 6,722,192 B2 | 4/2004 | Benedict et al. |
| 6,725,260 B1 | 4/2004 | Philyaw |
| 6,725,281 B1 | 4/2004 | Zintel et al. |
| 6,728,956 B2 | 4/2004 | Ono |
| 6,742,025 B2 | 5/2004 | Jennery et al. |
| 6,751,681 B2 | 6/2004 | Torii et al. |
| 6,754,723 B2 | 6/2004 | Kato |
| 6,760,761 B1 | 7/2004 | Sciacca |
| 6,763,403 B2 | 7/2004 | Cheng et al. |
| 6,766,175 B2 | 7/2004 | Uchiyama |
| 6,766,956 B1 | 7/2004 | Boylan, III et al. |
| 6,770,028 B1 | 8/2004 | Ali et al. |
| 6,772,264 B1 | 8/2004 | Dayan et al. |
| 6,778,824 B2 | 8/2004 | Wonak et al. |
| 6,779,068 B2 | 8/2004 | Kim |
| 6,784,855 B2 | 8/2004 | Matthews et al. |
| 6,806,813 B1 | 10/2004 | Cheng et al. |
| 6,832,082 B1 | 12/2004 | Ramaswamy et al. |
| 6,832,373 B2 | 12/2004 | O'Neill |
| 6,833,787 B1 | 12/2004 | Levi |
| 6,833,989 B2 | 12/2004 | Helot et al. |
| 6,850,158 B1 | 2/2005 | Williams |
| 6,854,112 B2 | 2/2005 | Crespo et al. |
| 6,857,013 B2 | 2/2005 | Ramberg et al. |
| 6,863,210 B2 | 3/2005 | Becker et al. |
| 6,864,891 B2 | 3/2005 | Myers |
| 6,868,468 B2 | 3/2005 | Boz et al. |
| 6,886,104 B1 | 4/2005 | McClurg et al. |
| 6,889,263 B2 | 5/2005 | Motoyama |
| 6,895,261 B1 | 5/2005 | Palamides |
| 6,895,445 B2 | 5/2005 | Ying et al. |
| 6,898,080 B2 | 5/2005 | Yin et al. |
| 6,904,457 B2 | 6/2005 | Goodman |
| 6,907,603 B2 | 6/2005 | Scott |
| 6,915,514 B1 | 7/2005 | Machida |
| 6,920,631 B2 | 7/2005 | Delo |
| 6,928,493 B2 | 8/2005 | Motoyama |
| 6,944,854 B2 | 9/2005 | Kehne et al. |
| 6,944,858 B2 | 9/2005 | Luu |
| 6,954,142 B2 | 10/2005 | Lieberman et al. |
| 6,955,517 B2 | 10/2005 | Nulman et al. |
| 6,959,172 B2 | 10/2005 | Becker et al. |
| 6,961,586 B2 | 11/2005 | Barbosa et al. |
| 6,966,058 B2 | 11/2005 | Earl et al. |
| 6,968,550 B2 | 11/2005 | Branson et al. |
| 6,970,952 B2 | 11/2005 | Motoyama |
| 6,973,799 B2 | 12/2005 | Kuehl et al. |
| 6,976,062 B1 | 12/2005 | Denby et al. |
| 6,981,086 B2 | 12/2005 | Wetzel et al. |
| 6,987,988 B2 | 1/2006 | Uchiyama |
| 6,990,549 B2 | 1/2006 | Main et al. |
| 6,990,660 B2 | 1/2006 | Moshir et al. |
| 6,993,615 B2 | 1/2006 | Falcon |
| 6,993,760 B2 | 1/2006 | Peev et al. |
| 6,996,634 B1 | 2/2006 | Herrod et al. |
| 6,999,898 B2 | 2/2006 | King et al. |
| 7,000,035 B1 | 2/2006 | Uchizono et al. |
| 7,000,228 B2 | 2/2006 | Mortazavi |
| 7,003,560 B1 | 2/2006 | Mullen et al. |
| 7,013,331 B2 | 3/2006 | Das |
| 7,020,571 B2 | 3/2006 | Lee |
| 7,024,189 B2 | 4/2006 | Wonak et al. |
| 7,039,688 B2 | 5/2006 | Matsuda et al. |
| 7,043,537 B1 | 5/2006 | Pratt |
| 7,054,423 B2 | 5/2006 | Nebiker et al. |
| 7,054,977 B2 | 5/2006 | Kadambi et al. |
| 7,069,006 B2 | 6/2006 | Wonak et al. |
| 7,072,675 B1 | 7/2006 | Kanakubo |

| | | |
|---|---|---|
| 7,076,536 B2 | 7/2006 | Chiloyan et al. |
| 7,080,371 B1 | 7/2006 | Arnaiz et al. |
| 7,085,805 B1 | 8/2006 | Ruberg et al. |
| 7,085,824 B2 | 8/2006 | Forth et al. |
| 7,086,049 B2 | 8/2006 | Goodman |
| 7,089,551 B2 | 8/2006 | Fordemwalt et al. |
| 7,099,152 B2 | 8/2006 | Gasbarro et al. |
| 7,100,271 B2 | 9/2006 | Baulier |
| 7,107,380 B1 | 9/2006 | Mohan |
| 7,111,055 B2 | 9/2006 | Falkner |
| 7,114,021 B2 | 9/2006 | Seshadri |
| 7,117,239 B1 | 10/2006 | Hansen |
| 7,117,286 B2 | 10/2006 | Falcon |
| 7,130,896 B2 | 10/2006 | Engel et al. |
| 7,133,939 B1 | 11/2006 | Desai et al. |
| 7,149,792 B1 | 12/2006 | Hansen et al. |
| 7,159,016 B2 | 1/2007 | Baker |
| 7,185,014 B1 | 2/2007 | Hansen |
| 7,188,160 B2 | 3/2007 | Champagne et al. |
| 7,188,171 B2 | 3/2007 | Srinivasan et al. |
| 7,191,435 B2 | 3/2007 | Lau et al. |
| 7,194,526 B2 | 3/2007 | Kanemitsu |
| 7,209,971 B1 | 4/2007 | Dabagh et al. |
| 7,216,343 B2 | 5/2007 | Das et al. |
| 7,272,711 B2 | 9/2007 | Suda et al. |
| 7,289,995 B2 | 10/2007 | Motoyama et al. |
| 7,290,258 B2 | 10/2007 | Steeb et al. |
| 7,316,013 B2 | 1/2008 | Kawano et al. |
| 7,409,478 B2 | 8/2008 | Kreiner et al. |
| 7,413,129 B2 | 8/2008 | Fruhauf |
| 7,543,080 B2 | 6/2009 | Schade |
| 7,725,627 B2 | 5/2010 | Crain, II et al. |
| 7,743,174 B2 | 6/2010 | Remaker et al. |
| 7,769,914 B2 | 8/2010 | Kim et al. |
| 7,843,915 B2 | 11/2010 | Kashyap |
| 7,857,222 B2 | 12/2010 | Kosecki et al. |
| 7,966,622 B1 | 6/2011 | Purser et al. |
| 7,996,896 B2 | 8/2011 | Durie |
| 8,000,266 B2 | 8/2011 | Bulusu et al. |
| 8,025,233 B2 | 9/2011 | Kosecki et al. |
| 8,297,508 B2 | 10/2012 | Kosecki et al. |
| 2001/0042112 A1 | 11/2001 | Slivka et al. |
| 2002/0073304 A1 | 6/2002 | Marsh et al. |
| 2002/0083160 A1 | 6/2002 | Middleton |
| 2002/0086703 A1 | 7/2002 | Dimenstein et al. |
| 2002/0087392 A1 | 7/2002 | Stevens |
| 2002/0087668 A1 | 7/2002 | San Martin et al. |
| 2002/0087960 A1 | 7/2002 | Hisatake |
| 2002/0092008 A1 | 7/2002 | Kehne et al. |
| 2002/0092013 A1 | 7/2002 | Delo |
| 2002/0094208 A1 | 7/2002 | Palumbo |
| 2002/0095484 A1 | 7/2002 | Pagani et al. |
| 2002/0100036 A1 | 7/2002 | Moshir et al. |
| 2002/0109665 A1 | 8/2002 | Matthews et al. |
| 2002/0129350 A1 | 9/2002 | Wang et al. |
| 2002/0129355 A1 | 9/2002 | Velten et al. |
| 2002/0147974 A1 | 10/2002 | Wookey |
| 2002/0184349 A1 | 12/2002 | Manukyan |
| 2002/0184350 A1 | 12/2002 | Chen |
| 2002/0187024 A1 | 12/2002 | Nulman |
| 2002/0191940 A1 | 12/2002 | Bourdeau |
| 2002/0198969 A1 | 12/2002 | Engel et al. |
| 2003/0018694 A1 | 1/2003 | Chen et al. |
| 2003/0031539 A1 | 2/2003 | Nulman et al. |
| 2003/0046675 A1 | 3/2003 | Cheng et al. |
| 2003/0051235 A1 | 3/2003 | Simpson |
| 2003/0059022 A1 | 3/2003 | Nebiker et al. |
| 2003/0084436 A1 | 5/2003 | Berger et al. |
| 2003/0088651 A1 | 5/2003 | Wilson, Jr. |
| 2003/0097427 A1 | 5/2003 | Parry |
| 2003/0111245 A1 | 6/2003 | Haggerty |
| 2003/0154471 A1 | 8/2003 | Teachman et al. |
| 2003/0188306 A1 | 10/2003 | Harris et al. |
| 2003/0198015 A1 | 10/2003 | Vogt |
| 2003/0217357 A1 | 11/2003 | Parry |
| 2003/0217358 A1 | 11/2003 | Thurston et al. |
| 2003/0221190 A1 | 11/2003 | Deshpande et al. |
| 2003/0225939 A1 | 12/2003 | Ying et al. |
| 2004/0002943 A1 | 1/2004 | Merrill et al. |
| 2004/0015949 A1 | 1/2004 | Taylor |
| 2004/0020974 A1 | 2/2004 | Becker et al. |
| 2004/0024933 A1 | 2/2004 | Billington et al. |
| 2004/0049233 A1 | 3/2004 | Edwards |
| 2004/0050247 A1 | 3/2004 | Topping |
| 2004/0078502 A1 | 4/2004 | Hsin et al. |
| 2004/0083471 A1 | 4/2004 | Nam et al. |
| 2004/0098571 A1 | 5/2004 | Falcon |
| 2004/0103172 A1 | 5/2004 | Chen et al. |
| 2004/0123281 A1 | 6/2004 | Olrik et al. |
| 2004/0127210 A1 | 7/2004 | Shostak |
| 2004/0139757 A1 | 7/2004 | Kuehl et al. |
| 2004/0143032 A1 | 7/2004 | Auschra et al. |
| 2004/0148600 A1 | 7/2004 | Hoshino |
| 2004/0154014 A1 | 8/2004 | Bunger |
| 2004/0168167 A1 | 8/2004 | Ono |
| 2004/0176072 A1 | 9/2004 | Gellens |
| 2004/0177380 A1 | 9/2004 | Hamel et al. |
| 2004/0181593 A1 | 9/2004 | Kanojia et al. |
| 2004/0192329 A1 | 9/2004 | Barbosa et al. |
| 2004/0199615 A1 | 10/2004 | Philyaw |
| 2004/0205709 A1 | 10/2004 | Hiltgen et al. |
| 2004/0210897 A1 | 10/2004 | Brockway et al. |
| 2004/0212822 A1 | 10/2004 | Schinner |
| 2004/0216099 A1 | 10/2004 | Okita et al. |
| 2004/0235532 A1 | 11/2004 | Matthews et al. |
| 2004/0243991 A1 | 12/2004 | Gustafson et al. |
| 2004/0243995 A1 | 12/2004 | Sheehy |
| 2004/0255023 A1 | 12/2004 | Motoyama et al. |
| 2004/0268340 A1 | 12/2004 | Steeb et al. |
| 2005/0044544 A1 | 2/2005 | Slivka et al. |
| 2005/0050538 A1 | 3/2005 | Kawamata et al. |
| 2005/0052156 A1 | 3/2005 | Liebenow |
| 2005/0060862 A1 | 3/2005 | Baulier |
| 2005/0065822 A1 | 3/2005 | Ying et al. |
| 2005/0086328 A1 | 4/2005 | Landram et al. |
| 2005/0093821 A1 | 5/2005 | Massie et al. |
| 2005/0097543 A1 | 5/2005 | Hirayama |
| 2005/0097544 A1 | 5/2005 | Kim |
| 2005/0108700 A1 | 5/2005 | Chen et al. |
| 2005/0132348 A1 | 6/2005 | Meulemans et al. |
| 2005/0132349 A1 | 6/2005 | Roberts et al. |
| 2005/0132350 A1 | 6/2005 | Markley et al. |
| 2005/0132351 A1 | 6/2005 | Randall et al. |
| 2005/0144612 A1 | 6/2005 | Wang et al. |
| 2005/0144614 A1 | 6/2005 | Moslander et al. |
| 2005/0159847 A1 | 7/2005 | Shah et al. |
| 2005/0204353 A1 | 9/2005 | Ji |
| 2005/0210458 A1 | 9/2005 | Moriyama et al. |
| 2005/0210459 A1 | 9/2005 | Henderson et al. |
| 2005/0210466 A1 | 9/2005 | Carter et al. |
| 2005/0223372 A1 | 10/2005 | Borchers |
| 2005/0223373 A1 | 10/2005 | Gage et al. |
| 2005/0229171 A1 | 10/2005 | Henry et al. |
| 2005/0235076 A1 | 10/2005 | Winarski et al. |
| 2005/0246703 A1 | 11/2005 | Ahonen |
| 2005/0251799 A1 | 11/2005 | Wang |
| 2005/0254776 A1 | 11/2005 | Morrison et al. |
| 2005/0257205 A1 | 11/2005 | Costea et al. |
| 2005/0257209 A1 | 11/2005 | Adams et al. |
| 2005/0273229 A1 | 12/2005 | Steinmeier et al. |
| 2005/0278001 A1 | 12/2005 | Qin et al. |
| 2006/0010437 A1 | 1/2006 | Marolia |
| 2006/0013646 A1 | 1/2006 | Baulier et al. |
| 2006/0029489 A1 | 2/2006 | Nulman et al. |
| 2006/0031617 A1 | 2/2006 | Falcon |
| 2006/0031828 A1 | 2/2006 | Won et al. |
| 2006/0041881 A1 | 2/2006 | Adkasthala |
| 2006/0049677 A1 | 3/2006 | Lawrence et al. |
| 2006/0069813 A1 | 3/2006 | Biamonte et al. |
| 2006/0070055 A1 | 3/2006 | Hodder et al. |
| 2006/0082965 A1 | 4/2006 | Walker et al. |
| 2006/0106965 A1 | 5/2006 | Falcon |
| 2006/0130037 A1 | 6/2006 | Mackay |
| 2006/0132964 A1 | 6/2006 | Lau et al. |
| 2006/0136893 A1 | 6/2006 | Blossom et al. |
| 2006/0142129 A1 | 6/2006 | Siaperas |
| 2006/0149321 A1 | 7/2006 | Merry et al. |
| 2006/0149322 A1 | 7/2006 | Merry et al. |

| | | | | | | |
|---|---|---|---|---|---|---|
| 2006/0149323 A1 | 7/2006 | Merry et al. | | 2007/0169090 A1 | 7/2007 | Kang |
| 2006/0150177 A1 | 7/2006 | Liu et al. | | 2007/0169092 A1 | 7/2007 | Lee |
| 2006/0156302 A1 | 7/2006 | Yamamoto et al. | | 2007/0169093 A1 | 7/2007 | Logan et al. |
| 2006/0168578 A1 | 7/2006 | Vorlicek | | 2007/0174834 A1 | 7/2007 | Purkeypile et al. |
| 2006/0168581 A1 | 7/2006 | Goger et al. | | 2007/0220505 A1 | 9/2007 | Bukovec et al. |
| 2006/0172873 A1 | 8/2006 | Beard | | 2007/0234331 A1 | 10/2007 | Schow et al. |
| 2006/0179431 A1 | 8/2006 | Devanathan et al. | | 2007/0245333 A1 | 10/2007 | Ferlitsch |
| 2006/0200812 A1 | 9/2006 | Mizutani et al. | | 2009/0045922 A1 | 2/2009 | Kosecki et al. |
| 2006/0206888 A1 | 9/2006 | Mavrinac et al. | | 2009/0132737 A1 | 5/2009 | Huang et al. |
| 2006/0218545 A1 | 9/2006 | Taguchi | | 2009/0328075 A1 | 12/2009 | Herskedal et al. |
| 2006/0236518 A1 | 10/2006 | Baulier | | 2010/0095019 A1 | 4/2010 | Hannel et al. |
| 2006/0238384 A1 | 10/2006 | Hess et al. | | 2010/0268857 A1 * | 10/2010 | Bauman et al. .................. 710/74 |
| 2006/0248522 A1 | 11/2006 | Lakshminarayanan et al. | | 2011/0090057 A1 | 4/2011 | Kosecki et al. |
| 2006/0248524 A1 | 11/2006 | Seely | | 2012/0000984 A1 | 1/2012 | Kosecki et al. |
| 2007/0006207 A1 | 1/2007 | Appaji | | 2013/0013936 A1 * | 1/2013 | Lin et al. ....................... 713/300 |
| 2007/0006213 A1 | 1/2007 | Shahidzadeh et al. | | 2013/0091310 A1 | 4/2013 | Caballero |
| 2007/0006214 A1 | 1/2007 | Dubal et al. | | | | |
| 2007/0038990 A1 | 2/2007 | White et al. | | | | |
| 2007/0055969 A1 | 3/2007 | Yang | | | | |
| 2007/0055970 A1 | 3/2007 | Sakuda et al. | | | | |
| 2007/0074201 A1 | 3/2007 | Lee | | | | |
| 2007/0083630 A1 | 4/2007 | Roth et al. | | | | |
| 2007/0169073 A1 | 7/2007 | O'Neill et al. | | | | |
| 2007/0169089 A1 | 7/2007 | Bantz et al. | | | | |

OTHER PUBLICATIONS

Jul. 2, 2013 Amendment filed in U.S. Application No. 13/267,342. En.

\* cited by examiner

DEVICE MANAGEMENT USING A DEDICATED MANAGEMENT INTERFACE

FIELD OF THE INVENTION

The invention relates to data communication and more particularly to management of data communication between a host computer system and peripheral device in communication with the host computer system.

BACKGROUND OF THE INVENTION

Many types of peripheral devices connect to a host computer system on which one or more applications execute. Those who manage deployment of peripheral devices, for instance a business entity that owns point-of-sale systems comprising host computer systems attached to barcode scanning peripheral devices, routinely face the need to manage their deployed peripheral devices. Peripheral devices connect to host computer system using a variety of wired and/or wireless communication interfaces, including a wired Universal Serial Bus interface. Typically, peripheral devices utilizing a Universal Serial Bus connection expose a single Universal Serial Bus interface to the host computer. This single interface is commonly owned by a Line of Business application on the host computer, which, in the example involving a barcode scanner peripheral device, typically performs data collection from the scanner. Alternatively, if the scanner device is capable of exposing more than one interface across a physical interface connection, a problem arises when another utility or application desires to manage the scanner over the existing interface since typically none of the interfaces are intended to act as a secondary channel (back door) for scanner device management purposes. Such managing becomes challenging absent interference with normal scanner operation and performance expected by the Line of Business application. For instance, the Line of Business application would release the interface, freeing the interface for a management application to user the scanner, which can be impractical, problematic, and inefficient.

SUMMARY OF THE INVENTION

The shortcomings of the prior art are overcome and additional advantages are provided through a method of managing data communication between a peripheral device and a host computer system, which method includes, for instance, exposing to the host computer system, by a processor of the peripheral device, multiple interfaces for data communication between the peripheral device and the host computer system, the multiple interfaces being exposed over a single physical interface between the peripheral device and the host computer system, the multiple interfaces for communicating data between the peripheral device and multiple applications executing on the host computer system, wherein the multiple interfaces comprise a dedicated management interface facilitating management of the peripheral device by a management application of the multiple applications executing on the host computer system.

Additional features and advantages are realized through the concepts of the present invention. Other embodiments and aspects of the invention are described in detail herein and are considered a part of the claimed invention.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
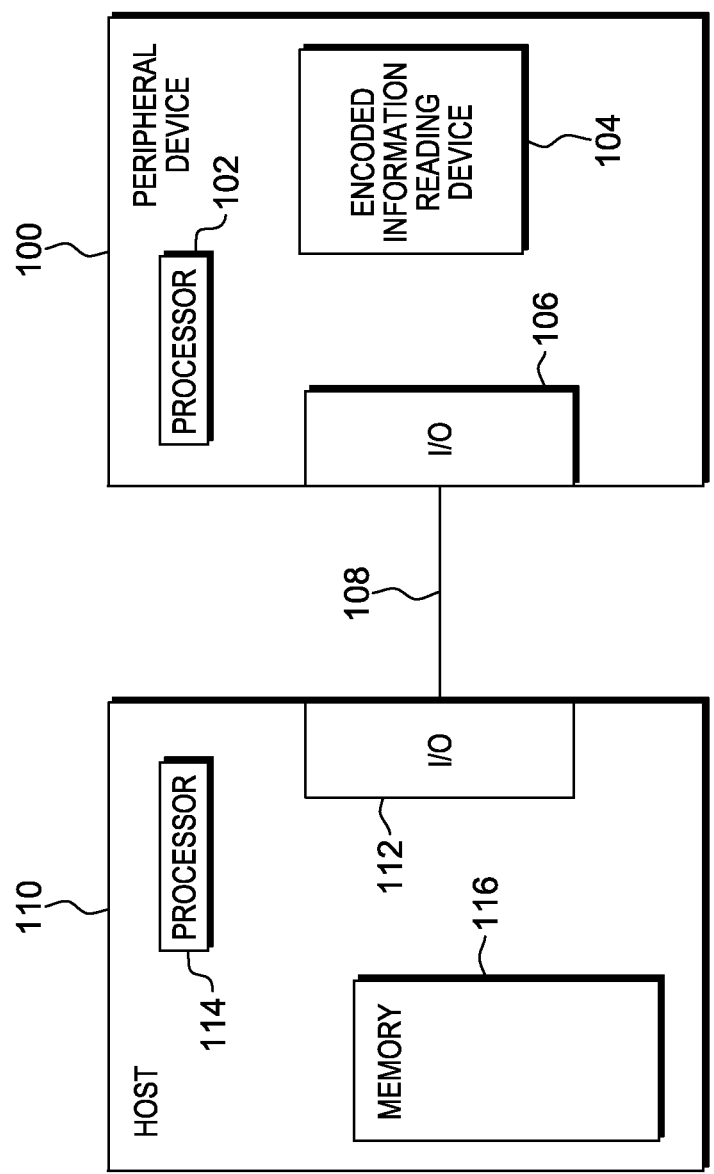
FIG. 1 depicts one embodiment of a host computer system in communication with a peripheral device, in accordance with one or more aspects of the present invention.

FIG. 1 depicts one embodiment of a host computer system in communication with a peripheral device, in accordance with one or more aspects of the present invention. In FIG. 1, peripheral device 100 communicates with host computer system 110 across communications link 108. Communications link can be any appropriate wired or wireless communication channel that supports analog or digital communication of data between peripheral device 100 and host 110. A non-limiting list of example communication links includes Universal Serial Bus, Wi-Fi™, and Bluetooth™ connections.

By way of specific example, peripheral device 100 is an encoded information reading terminal comprising a processor 102 (such as a CPU) and one or more encoded information reading device 104. Encoded information reading device 104 can be provided, e.g. by a bar code reading device, an RFID reading device, and a card reading device. Encoded information reading device 104 can be operative to output one or more of a decoded message decoded from raw signal or a raw signal comprising an encoded message. Shown in the block view as being provided by a separate unit external to processor 102 processing functionality of encoded information device 104 can be provided by processor 102. In operation of peripheral device 100, image signals can be read out of encoded information reading device 104 and stored into a volatile or non-volatile memory (not pictured), such as random access memory, read only memory, or any other type of storage memory. Processor 102 can be adapted to perform various algorithms including reading out image data stored in memory and/or algorithms supporting communication of data across communications link 108 via one or more I/O component(s) 106.

Host 110 similarly includes I/O component(s) 112. I/O components include one or more physical interfaces for communicating data to/from peripheral device 100. These interfaces comprise one or more hardware components. In the example of a Universal Serial Bus communications link, a supporting physical interface comprises a Universal Serial Bus port, as an example.

Host 110 also includes processor 114 (such as a CPU) and memory 116. Memory 116 can include one or more volatile or non-volatile memories of one or more types, such as random access memory, read only memory, or any other type of storage memory, such as a hard disk drive.

Figure 2:
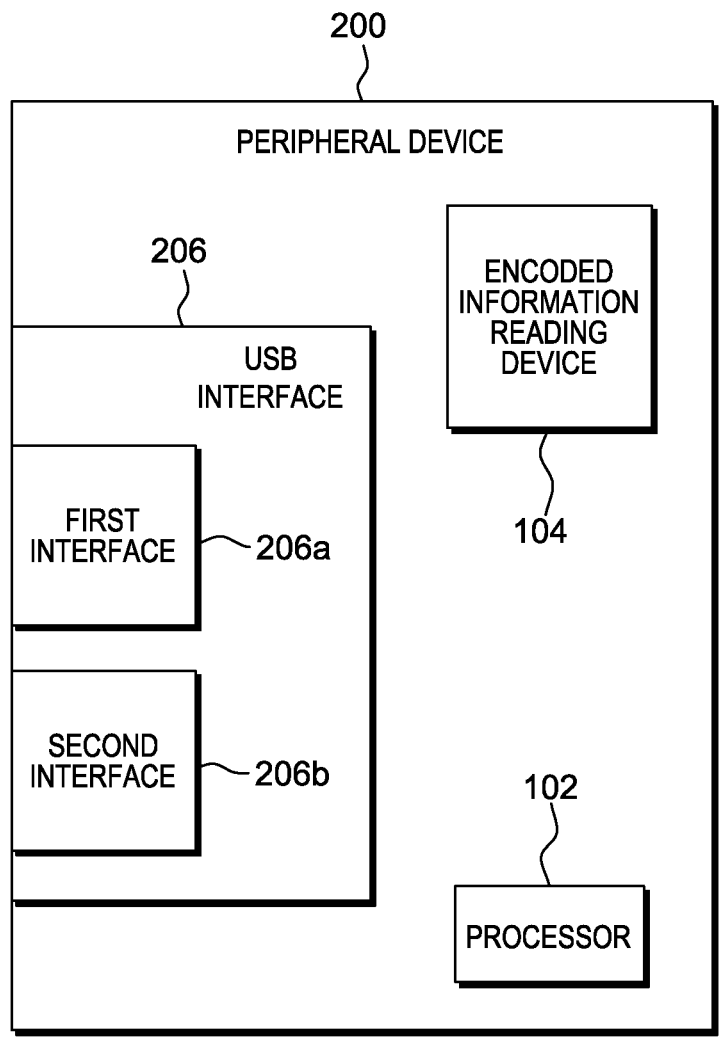
FIG. 2 depicts further details of a peripheral device, in accordance with one or more aspects of the present invention.

Further details of a peripheral device in accordance with one or more aspects of the present invention are described with reference to FIG. 2. In FIG. 2, peripheral device 200 includes processor 102 and encoded information reading device 104, as in FIG. 1. Additionally, peripheral device 200 includes a Universal Serial Bus physical interface 206. Typically, Universal Serial Bus physical interface 206 would present one interface for communication with an external device, such as a host computer. In accordance with one or more aspects of the present invention, one or more additional interfaces are created in physical interface 206 for presentation across, e.g., a single Universal Serial Bus physical communication link, such as a Universal Serial Bus Cable. An additional interface includes a dedicated management interface through which device management can be performed in parallel with a data collection processes. Thus, in FIG. 2, physical interface 206 includes a first interface 206*a* and a second interface 206*b*. While only two interfaces are depicted within physical interface 206 in FIG. 2, it should be understood that the number of interfaces presented within physical interface 206 could be any number of interfaces.

First interface 206*a* can be dedicated to device management, that is, it can be dedicated to data communication between one or more management applications on a host computer communicating with peripheral device 200. In this manner, data communications between the one or more management applications are received by peripheral device 200 via first interface 206*a*. Meanwhile, second interface 206*b* can be a data collection interface dedicated to communication between peripheral device 200 and another application on a host computer, such as a line of business application executing thereon for data collection. This facilitates both device management and data collection in parallel by separate applications executing on the host computer, without affecting performance or expected operation of the applications, thus simplifying the hardware and software components necessary to achieve this functionality. Further details of a host computer system in communication with a peripheral device in accordance with one or more aspects of the present invention are depicted in and described with reference to FIG. 3.

Figure 3:
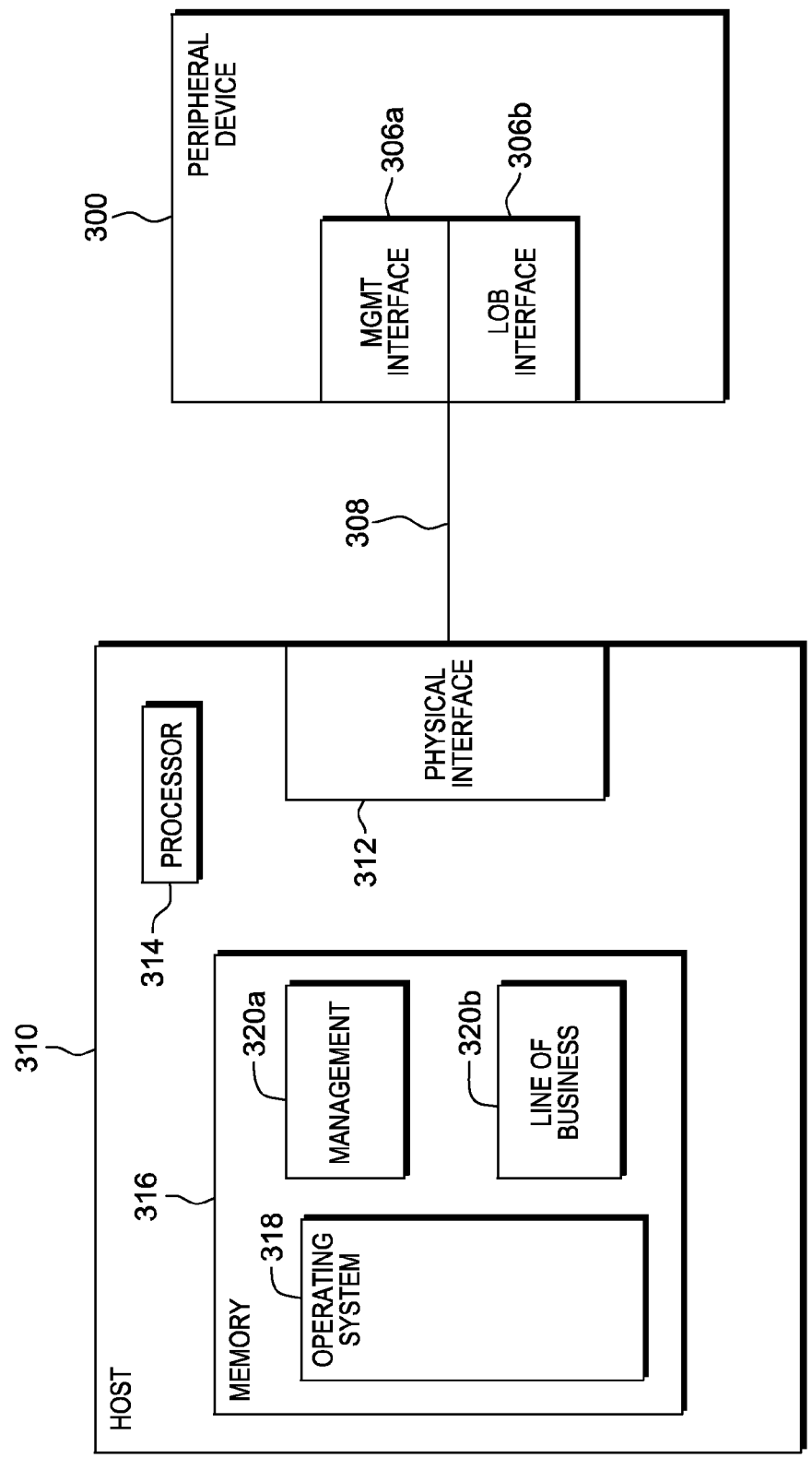
FIG. 3 depicts further details of a host computer system in communication with a peripheral device, in accordance with one or more aspects of the present invention.

In FIG. 3, host 310 includes processor 314 and memory 316. Host 320 also includes physical interface 312, comprising one or more hardware components, for communicating data to/from peripheral device 300. In this example, communications link 308 comprises a Universal Serial Bus communications link, and supporting physical interface 312 includes a Universal Serial Bus port.

As is understood by those having ordinary skill in the art, a processor can be configured to execute instructions of a program. Common such programs are an operating system and applications which run on the operating system from memory. In FIG. 3, processor 314 executes operating system 318 and applications 320*a* and 320*b* from memory 316. Application 320*b* comprises a line of business application. A line of business (LOB), in general, is a group of one or more related applications or modules which service a business need. In the context of host-peripheral device communication, a line of business application may be responsible for sending data to and/or receiving data from a peripheral device. In the specific example of a barcode scanner, the line of business application can execute on the host machine and accept from the peripheral device decoded data which is read-out from an encoded image (such as a barcode) using the peripheral device.

Application 320*a* in FIG. 3 comprises a management application. Management application 320*a* supports device management of a peripheral device, such as peripheral device 300. Examples of device management include performance of a firmware upgrade of the firmware of peripheral device 300, and performance of a reconfiguration of peripheral device 300, such as a reconfiguration to adjust one or more operating parameters of peripheral device 300.

In the example of FIG. 3, peripheral device 300 behaves as a Universal Serial Bus composite device listing multiple logical interfaces. Responsive to receiving a host enumeration command from host 310, peripheral device 300 responds by listing a dedicated management interface (306*a*) of a predefined type to facilitate management of peripheral device 300, and listing a line of business interface (306*b*) for data communication with line of business application 320*b* of host 310. Dedicated management interface 306*a* can be of a specific type that host operating system 318 matches to a preinstalled device driver, so that no custom driver for dedicated management interface 306*a* is needed. As those having ordinary skill in the art will recognize, device drivers for interfaces 306*a* and 306*b* enable host operating system 318 to recognize interfaces 306*a* and 306*b* exposed by peripheral device 300 to host 310 across communication link 308. Operating system 318 can then expose these interfaces to line of business application 320*b* and management application 320*a* executing on host 310.

In one embodiment, dedicated management interface 306*a* can be a Universal Serial Bus Human Interface Device (USB HID) class interface, for instance a barcode scanner interface, but with a non-standard usage page number that is not appealing to line of business application 320*b* as a data collection option. By using a non-standard page number (in this example), line of business application 320*b* will ignore the interface. Using a non-standard page number is just one way of using a non-standard configuration in order to cause line of business application 320*b* to ignore management interface 306*a*; there are many other ways of varying this configuration to expose management interface 306*a* in such as way that is it not appealing to line of business application 320*b*.

In operation, dedicated management interface 306*a* can receive special treatment from both management application 320*a* running on host 310 and from the firmware (not pictured) of peripheral device 300. For instance, on the host side, management application 320*a* can be configured to recognize management interface 306*a*, and be able to connect to it, enabling data communication between management application 320*a* and management interface 306*a* of peripheral device 300.

On the peripheral device side, commands received from host 310 through dedicated management interface 306*a* can be replied-to (from peripheral device 300 to host 310) using dedicated management interface 306*a*, rather than using another interface, such as line of business interface 306*b*. The opposite is also true: commands received from host 310 through line of business interface 306*b* can be replied-to using line of business interface 306*b*. Peripheral device 300 is therefore aware of which interface was the interface though which a command was received and is configured to reply to host 310 using that interface, so that the reply reaches the appropriate host application. This also enables peripheral device 300 to recognize unique commands when coming through dedicated management interface 306*a*, which may not be valid over line of business interface 306*b*.

Additionally, peripheral device 300 can send custom unsolicited notifications (i.e.: bar code reading statistics, low battery notifications, etc) over dedicated management interface 306*a*. These notifications can be provided across management interface 306*a* and not across line of business interface 306*b*, if so desired.

Peripheral device 300 can prioritize data communication through the different interfaces. For instance, in case multiple commands arrive concurrently over different interfaces, from applications on the host, peripheral device 300 can give priority to one of the interfaces over the other interface(s). As an example, the peripheral device can give priority to execute data collection events (e.g.: reading a barcode) on line of business interface 306b, so that the application performance of the data collection application (line of business application 320b on host 310) in not affected. Additionally, the peripheral device can be configured to always finish the execution of a request before processing a new request on the same or different interface (i.e.: adhere to the transaction concept to guarantee consistency of data). In this case, the new request, received during execution of a previously received request, may still be accepted and placed in a queue.

In a further enhancement, peripheral device 300 can be selectively configured for exclusive use of any one or more of the multiple interfaces to the host computer system. For instance, peripheral device 300 can include a special operation mode where the dedicated management interface becomes exclusive until the peripheral device is configured otherwise. There are various ways of achieving this including, but not limited to: signaling the host operating system that the other interface(s) are busy, temporarily blocking or placing on hold the other interface(s), or by queuing requests. Alternatively or additionally, the peripheral device could temporarily expose only one interface, such as the dedicated management interface, for exclusive use thereof. It may be important, in these scenarios to avoid reporting an error condition from the other applications, for instance the line of business application. This exclusive use of only the dedicated management interface can be enabled to facilitate performance of a firmware upgrade or peripheral device reconfiguration, as examples. By exclusively using the management interface, without having to worry about the other interface(s), the peripheral device can pay full attention to the particular management operation being requested, without interruption, and enabling it to dedicate the necessary hardware resources of the peripheral device (CPU, memory, etc) to the particular task. This can be advantageous in that, for limited-resource peripheral devices, communication errors are less frequent since the peripheral device is not stressed by trying to process requests on all interfaces.

Figure 4:
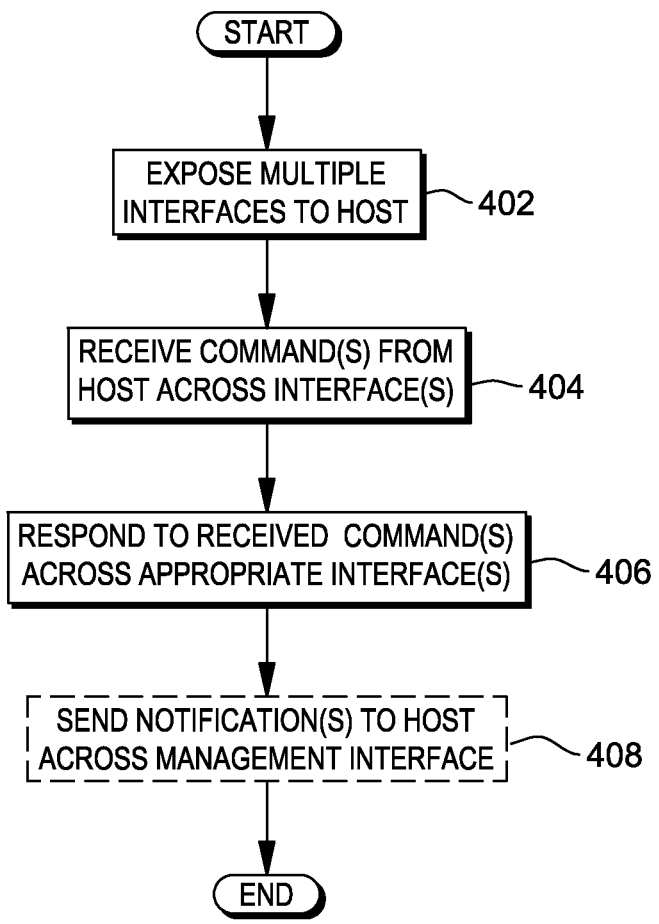
FIG. 4 depicts one example of a process for managing data communication between a peripheral device and host computer system, in accordance with one or more aspects of the present invention.

FIG. 4 depicts an example of a process for managing data communication between a peripheral device and host computer system, in accordance with one or more aspects of the present invention. The process begins by exposing multiple interfaces of a peripheral device to a host computer system (402). In one example, this is performed responsive to a host enumeration request by a host computer system. Next, peripheral device receives one or more commands from the host computer system across one or more of the multiple interfaces (404). The peripheral device can perform one or more operations responsive to receiving the one or more commands. Then, the peripheral device responds to the received command(s) across an appropriate interface of the multiple interfaces (406). As discussed above, an appropriate interface for responding to a command can be the interface through which the command was received. In this manner, requests received across a management interface of the multiple interfaces can be responded-to using the management interface, so that the proper management application executing on the host receives the response. Additionally, the peripheral device can optionally send one or more notifications to a management application of the host computer system across the management interface of the multiple interfaces (408).

Aspects of the present invention provide the existence of a dedicated interface with potentially special treatment by the peripheral device and the host computer. Aspects of the present invention can be applied to any type of interface used by a peripheral device, and thus can be applied to other types of interfaces (including those that are not physically limited to be a single interface), for instance Bluetooth™, WiFi™, or ZigBee interfaces.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 5:
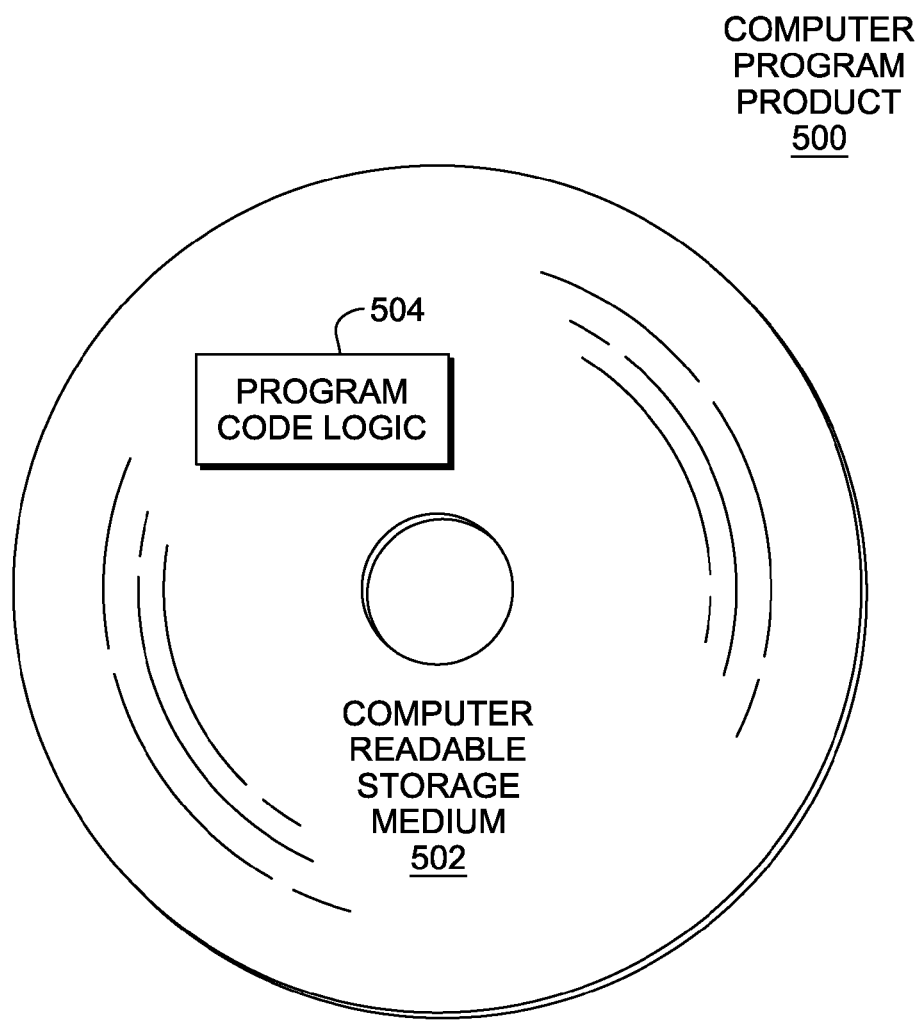
FIG. 5 depicts one embodiment of a computer program product to incorporate one or more aspects of the present invention.

Referring now to FIG. 5, in one example, a computer program product 500 includes, for instance, one or more computer readable media 502 to store computer readable program code means or logic 504 thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

A small sample of methods that are described herein is as follows:

A1. A method for managing data communication between a peripheral device and a host computer system, the method comprising: exposing to the host computer system, by a processor of the peripheral device, multiple interfaces for data communication between the peripheral device and the host computer system, the multiple interfaces being exposed over a single physical interface between the peripheral device and the host computer system, the multiple interfaces for communicating data between the peripheral device and multiple applications executing on the host computer system, wherein the multiple interfaces comprise a dedicated management interface facilitating management of the peripheral device by a management application of the multiple applications executing on the host computer system.

A2. The method of A1, wherein the multiple interfaces further comprise a line of business interface for data communication between the peripheral device and a line of business application of the multiple applications, and wherein the dedicated management interface and the line of business interface are exposed separately to the host computer system to facilitate peripheral device management across the dedicated management interface in parallel with data collection across the line of business interface by the line of business application.

A3. The method of A1, wherein the single physical interface comprises a Universal Serial Bus interface.

A4. The method of A3, wherein the peripheral device behaves as a Universal Serial Bus composite device exposing the multiple interfaces responsive to a Universal Serial Bus host enumeration request.

A5. The method of A1, wherein the dedicated management interface comprises a Universal Serial Bus Human Interface Device class interface, wherein the peripheral device exposes the Universal Serial Bus Human Interface Device class interface as having a non-standard configuration so as to be ignored by a line of business application of the multiple applications executing on the host computer system.

A6. The method of A5, wherein the non-standard configuration comprises a non-standard usage page number of the Universal Serial Bus Human Interface Device class interface.

A7. The method of A1, further comprising receiving commands by the peripheral device from the host computer system across the multiple interfaces and responding to the received commands, wherein the peripheral device, in responding to a command, responds to the command across a same interface of the multiple interfaces through which the command was received from the host computer.

A8. The method of A7, wherein the peripheral device is configured to give priority to one interface of the multiple interfaces, responsive to contemporaneously receiving more than one command across more than one interface of the multiple interfaces.

A9. The method of A8, wherein priority is given to a data collection interface of the multiple interfaces over the dedicated management interface of the multiple interfaces, the data collection interface collecting barcode data for provision to a line of business application of the multiple applications executing on the host computer system.

A10. The method of A1, further comprising sending one or more notifications over the dedicated management interface to the host computer system, wherein the one or more notifications are not made available across the other interfaces of the multiple interfaces.

A11. The method of A10, wherein the one or more notifications comprise bar code reading statistics.

A12. The method of A10, wherein the one or more notifications comprise a low battery notification A13. The method of A1, wherein the peripheral device is selectably configurable to exclusively use of one interface of the multiple interfaces to facilitate performance of at least one of: a firmware upgrade, or a peripheral device reconfiguration.

A14. The method of A13, wherein exclusive use of one interface of the multiple interfaces comprises one of temporarily blocking requests through other interfaces of the multiple interfaces through the period of exclusive use of the one interface, or temporarily queuing requests through other interfaces of the multiple interfaces through the period of exclusive use of the one interface.

A15. The method of A1, wherein the peripheral device is selectably configurable to expose any one or more of the multiple interfaces to the host computer system.

A16. The method of A15, wherein the peripheral device is selectably configurable to expose only the dedicated management interface to facilitate performance of at least one of: a firmware upgrade, or a peripheral device reconfiguration.

A17. The method of A1, wherein the peripheral device is configurable to recognize commands received through the dedicated management interface as being valid, wherein the commands are not recognized as being valid if received through other interfaces of the multiple interfaces.

A18. The method of A1, wherein the single physical interface comprises at least one of: a Bluetooth interface, a WiFi interface, or a ZigBee interface.

A19. The method of A1, wherein the peripheral device comprises an encoded information reading device configured to output a decoded message, wherein data communicated between the peripheral device and the host computer system comprises the decoded message and wherein the decoded message is communicated to a line of business application of the multiple applications executing on the host computer system.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

What is claimed is:

1. A method for managing data communication between a peripheral device and a host computer system, the method comprising:
   exposing to the host computer system, by a processor of the peripheral device, multiple interfaces for data communication between the peripheral device and the host computer system, the multiple interfaces being exposed over a single physical interface between the peripheral device and the host computer system, the multiple interfaces for communicating data between the peripheral device and multiple applications executing on the host computer system, wherein the multiple interfaces comprise a dedicated management interface facilitating management of the peripheral device by a management application of the multiple applications executing on the host computer system.

2. The method of claim 1, wherein the multiple interfaces further comprise a line of business interface for data communication between the peripheral device and a line of business application of the multiple applications, and wherein the dedicated management interface and the line of business interface are exposed separately to the host computer system to facilitate peripheral device management across the dedicated management interface in parallel with data collection across the line of business interface by the line of business application.

3. The method of claim 1, wherein the single physical interface comprises a Universal Serial Bus interface.

4. The method of claim 3, wherein the peripheral device behaves as a Universal Serial Bus composite device exposing the multiple interfaces responsive to a Universal Serial Bus host enumeration request.

5. The method of claim 1, wherein the dedicated management interface comprises a Universal Serial Bus Human Interface Device class interface, wherein the peripheral device exposes the Universal Serial Bus Human Interface Device class interface as having a non-standard configuration so as to be ignored by a line of business application of the multiple applications executing on the host computer system.

6. The method of claim 5, wherein the non-standard configuration comprises a non-standard usage page number of the Universal Serial Bus Human Interface Device class interface.

7. The method of claim 1, further comprising receiving commands by the peripheral device from the host computer system across the multiple interfaces and responding to the received commands, wherein the peripheral device, in responding to a command, responds to the command across a same interface of the multiple interfaces through which the command was received from the host computer.

8. The method of claim 7, wherein the peripheral device is configured to give priority to one interface of the multiple interfaces, responsive to contemporaneously receiving more than one command across more than one interface of the multiple interfaces.

9. The method of claim 8, wherein priority is given to a data collection interface of the multiple interfaces over the dedicated management interface of the multiple interfaces, the data collection interface collecting barcode data for provision to a line of business application of the multiple applications executing on the host computer system.

10. The method of claim 1, further comprising sending one or more notifications over the dedicated management interface to the host computer system, wherein the one or more notifications are not made available across other interfaces of the multiple interfaces.

11. The method of claim 10, wherein the one or more notifications comprise bar code reading statistics.

12. The method of claim 10, wherein the one or more notifications comprise a low battery notification.

13. The method of claim 1, wherein the peripheral device is selectably configurable to exclusively use of one interface of the multiple interfaces to facilitate performance of at least one of: a firmware upgrade, or a peripheral device reconfiguration.

14. The method of claim 13, wherein exclusive use of one interface of the multiple interfaces comprises one of temporarily blocking requests through other interfaces of the multiple interfaces through a period of exclusive use of the one interface, or temporarily queuing requests through other interfaces of the multiple interfaces through a period of exclusive use of the one interface.

15. The method of claim 1, wherein the peripheral device is selectably configurable to expose any one or more of the multiple interfaces to the host computer system.

16. The method of claim 15, wherein the peripheral device is selectably configurable to expose only the dedicated management interface to facilitate performance of at least one of: a firmware upgrade, or a peripheral device reconfiguration.

17. The method of claim 1, wherein the peripheral device is configurable to recognize commands received through the dedicated management interface as being valid, wherein the commands are not recognized as being valid if received through other interfaces of the multiple interfaces.

18. The method of claim 1, wherein the single physical interface comprises at least one of: a Bluetooth interface, a WiFi interface, or a ZigBee interface.

19. The method of claim 1, wherein the peripheral device comprises an encoded information reading device configured to output a decoded message, wherein data communicated between the peripheral device and the host computer system comprises the decoded message and wherein the decoded message is communicated to a line of business application of the multiple applications executing on the host computer system.

* * * * *